United States Patent
Gamble et al.

(10) Patent No.: US 11,212,299 B2
(45) Date of Patent: Dec. 28, 2021

(54) SYSTEM AND METHOD FOR MONITORING SECURITY ATTACK CHAINS

(71) Applicant: ROYAL BANK OF CANADA, Montreal (CA)

(72) Inventors: Jamie Gamble, Toronto (CA); Sahar Rahmani, Toronto (CA); Amitkumar Tiwari, Toronto (CA)

(73) Assignee: Royal Bank of Canada, Montreal (CA)

( * ) Notice: Subject to any disclaimer, the term of this patent is extended or adjusted under 35 U.S.C. 154(b) by 65 days.

(21) Appl. No.: 16/401,052

(22) Filed: May 1, 2019

(65) Prior Publication Data

US 2019/0342307 A1  Nov. 7, 2019

Related U.S. Application Data

(60) Provisional application No. 62/665,198, filed on May 1, 2018, provisional application No. 62/665,208, filed on May 1, 2018.

(51) Int. Cl.
| | |
|---|---|
| *H04L 29/06* | (2006.01) |
| *G06F 16/907* | (2019.01) |
| *G06F 16/901* | (2019.01) |
| *G06F 21/55* | (2013.01) |

(52) U.S. Cl.
CPC ........ *H04L 63/1416* (2013.01); *G06F 16/907* (2019.01); *G06F 16/9024* (2019.01); *G06F 21/552* (2013.01); *H04L 63/1433* (2013.01); *G06F 2221/034* (2013.01)

(58) Field of Classification Search
CPC . H04L 63/14; H04L 63/1408; H04L 63/1416; H04L 63/1425; H04L 63/1433; G06F 16/907; G06F 16/9024; G06F 21/50; G06F 21/55; G06F 21/552; G06F 21/554
See application file for complete search history.

(56) References Cited

U.S. PATENT DOCUMENTS

| | | | |
|---|---|---|---|
| 9,225,730 B1 * | 12/2015 | Brezinski | ............... G06F 21/00 |
| 9,516,053 B1 | 12/2016 | Muddu | |
| 9,537,884 B1 * | 1/2017 | Raugas | ............... H04L 63/1433 |
| 9,628,506 B1 * | 4/2017 | Han | ..................... H04L 63/145 |
| 10,009,358 B1 * | 6/2018 | Xie | ....................... G06F 21/552 |

(Continued)

OTHER PUBLICATIONS

Berger et al., Assessing the Real-World Dynamics of DNS, TMA 2012, LNCS 7189, pp. 1-14, 2012 (Year: 2021).

(Continued)

*Primary Examiner* — Khang Do
(74) *Attorney, Agent, or Firm* — Norton Rose Fulbright Canada LLP

(57) ABSTRACT

A cybersecurity platform is described that processes collected data using a data model to identify and link anomalies and in order to identify generate security events and intrusions. The platform generates graph data structures using the security anomalies extended using additional data. The graph data structures represent links between nodes, the links being events, the nodes being machines and user accounts. The platform processes the graph data structures by combining similar nodes or grouping security events with common features to behaviour indicative of a single or multiple security events to identify chains of events which together represent an attack.

20 Claims, 6 Drawing Sheets

(56) References Cited

U.S. PATENT DOCUMENTS

| | | | |
|---|---|---|---|
| 10,685,284 B2 | 6/2020 | Smyth | |
| 10,694,026 B2 | 6/2020 | Chandrasekaran | |
| 10,706,144 B1* | 7/2020 | Moritz | G06F 21/55 |
| 10,805,326 B1* | 10/2020 | Wang | H04L 63/1416 |
| 10,958,667 B1* | 3/2021 | Maida | H04L 63/1483 |
| 2008/0016570 A1* | 1/2008 | Capalik | G06F 21/566 |
| | | | 726/23 |
| 2011/0083180 A1* | 4/2011 | Mashevsky | G06F 21/56 |
| | | | 726/23 |
| 2015/0013000 A1* | 1/2015 | Linnakangas | H04L 63/168 |
| | | | 726/14 |
| 2016/0301709 A1* | 10/2016 | Hassanzadeh | H04L 63/1408 |
| 2016/0371489 A1* | 12/2016 | Puri | H04L 63/1425 |
| 2017/0171230 A1* | 6/2017 | Leiderfarb | H04L 63/145 |
| 2017/0251013 A1 | 8/2017 | Kirti | |
| 2018/0004948 A1* | 1/2018 | Martin | G06F 21/566 |
| 2018/0034840 A1* | 2/2018 | Marquardt | G06F 16/9024 |
| 2018/0219914 A1* | 8/2018 | Reith | H04L 63/1425 |
| 2018/0268264 A1* | 9/2018 | Marwah | G06K 9/623 |
| 2018/0316704 A1* | 11/2018 | Joseph Durairaj | H04L 63/1425 |
| 2018/0329958 A1* | 11/2018 | Choudhury | G06F 16/2343 |
| 2018/0375893 A1* | 12/2018 | Jordan | G06N 5/046 |
| 2019/0052514 A1* | 2/2019 | Tee | H04L 63/029 |
| 2019/0068627 A1 | 2/2019 | Thampy | |
| 2019/0098024 A1* | 3/2019 | Gaivoronski | H04L 63/1416 |
| 2019/0121971 A1* | 4/2019 | Tang | H04L 41/0613 |
| 2019/0182273 A1* | 6/2019 | Walsh | H04L 63/1483 |
| 2019/0215331 A1* | 7/2019 | Anakata | H04L 41/046 |
| 2019/0295296 A1* | 9/2019 | Gove, Jr. | G06F 16/287 |

OTHER PUBLICATIONS

Moustafa, Designing an online and reliable statistical anomaly detection framework for dealing with large high-speed network traffic, PhD thesis, Jun. 2017, 346 pages (Year: 2017).

Office Action dated Oct. 8, 2020 issued in U.S. Appl. No. 16/400,880.

Notice of Allowance dated May 28, 2021 issued in U.S. Appl. No. 16/400,880.

* cited by examiner

SYSTEM AND METHOD FOR MONITORING SECURITY ATTACK CHAINS

CROSS REFERENCE TO RELATED APPLICATIONS

This application is a non-provisional of, and claims all benefit, including priority to, U.S. Application No. 62/665,198, entitled SYSTEM AND METHOD FOR MONITORING SECURITY ATTACK CHAINS, dated 1 May 2018, and U.S. Application No. 62/665,208, entitled SYSTEM AND METHOD FOR REDUCING FALSE POSITIVE SECURITY EVENTS, dated 1 May 2018, the contents of these documents incorporated herein by reference in their entirety.

FIELD

The present disclosure generally relates to the field of cybersecurity and risk management, and more particularly, to techniques for monitoring security attack chains.

INTRODUCTION

Embodiments described herein relate to cybersecurity or security platforms to protect resources (e.g., computer resources, physical objects, buildings, individuals) from theft, damage, disruption or other harm.

A challenge that is encountered by enterprises is how to limit the number of abnormal events to those that are relevant from a security perspective. Traditional approaches usually rely upon over optimizing the model to remove false positives. This often still results in a large number of false positives and potentially removed important alerts.

SUMMARY

Systems, methods, and computer readable media are described and directed to transforming data representative of abnormal events generated by data analytics by adding data values representative of contextual information to help ensure security mechanisms are focusing on investigating the significant threats.

Data is collected from different data points in a security infrastructure. In a cybersecurity embodiment, data can be collected from networking components, such as network routers, switches, filters. These could include network endpoints (servers and workstations), network infrastructure, security appliances, or other devices that generate data relevant to network security.

The data is modeled and analytics are conducted to identify anomalies. Each model/analytic produces an event that includes a descriptive data that indicates the potential security consequences. The information values, for example, could include the potential severity of the event, a probability that the event is not security related (or is likely a false positive), and a reference to which stage of an attack that this event could correspond to. In addition to this information, each event could contain details of the potential attack, including which users are potentially impacted and which machine (externally and locally) are impacted, and the time the event occurred. Processing of the individual alerts is conducted in some embodiments to enhance the validity of the alerts by leveraging external and internal data. In the approach of some embodiments described herein, no events/alerts will be removed from the data set in contrast to other approaches that over optimize the processing of alerts to remove false positives.

The alerts are gathered and stored in a central location that includes previously generated alerts, and additional event data that are not considered security incidents is extracted from the available data sources and added with the security alerts. This information can include relationships between machines, such as implicit trusts (e.g. machine A trusts machine B, essentially allowing machine B to perform actions on A with lower security requirements).

Examples include network file shares that allow other machines to modify local system files, and machines that do not require passwords for logging in from trusted hosts), and network login information (logins that happen between machines rather than interactively on a workstation).

The security events/alerts data and the related event data are combined into a multiple graph form that represents the links between events. For example, a security event between two machines would have two nodes (each machine), connected by a link that is the event (e.g. a suspicious use login). The security events are associated with labels having stored data values indicative of details describing the events, such as a risk rating, weighting or probability indicating how likely it is to be a false positive, the time it occurred, what phase of an attack lifecycle it potentially corresponds to, and the frequency of observed occurrences.

The multiple graphs are centralized where an analysis of each graph, and how they compare to each other is conducted. Since many potential false positives have not been filtered out of the events, many of the graphs will consist of very few linked nodes as the events were not part of an ongoing attack. By identifying unique groupings of events in a graph form, the system attempts to identify intrusions more complex than a simple malware infection (e.g., an "attack chain").

A graph data structure is generated that can be used to provide a more accurate detection mechanism of an intrusion. In contrast to approaches that identify individual alerts that require investigation, embodiments described herein are computational mechanisms that attempt to identify chains of related events that when reviewed individually could be false positives or dismissed as normal network traffic through generated graph structures.

In accordance with an aspect, there is provided a cybersecurity platform comprising a processor and a memory storing machine executable instructions to configure the processor to: collect data from different data points in a network; process the collected data using a data model to identify anomalies and generate security events, each event having descriptive data indicating a security threat; correlate and store the security events in a data store, the data store storing previously generated security events; extract additional event data not considered to represent security incidents and combining the additional data with the security events; generate graph data structures using the security events and the additional event data, the graph data structures indicating links between nodes, the links being events or interactions between the nodes, the nodes being an entity (e.g. a machine, individual, computer account, physical entity such as a building); collect and store the graph data structures in the data store; process the graph data structures by combining similar nodes or grouping security events with common features; and generate and transmit security alerts using the processed graph data structures.

In some embodiments, the descriptive data indicates the security threat comprising a potential severity of the event, a probability that the event is not security related, and a reference to a stage of an attack that the event can correspond to.

In some embodiments, each security event or anomaly indicates potential attack data, identification of users that may be implicated by the event, identification of machines that may be implicated by the event, and time data. The inclusion of these types of events help to ensure that all of the possible ways events are linked together can be represented in a graph form. This will provide the approaches and models used to compare the graphs with more data points to which will result in improved technical comparisons.

In some embodiments, the processor is configured to label the graph data structures with the descriptive data. This would improve the feature set available to a data science mechanism (e.g., a machine learning data model architecture) that could be used to analyze the graph.

In some embodiments, the descriptive data comprises a risk rating, a weighting or probability indicating likelihood that the security event is a false positive, the time the security event occurred, what phase of an attack lifecycle the security event potentially corresponds to, and the frequency of observed occurrences.

In some embodiments, the processor is configured to implement additional processing of the security events before storing in the data store by leveraging external and internal data linked to the events. The enrichment of the data linked to the events will provide more data points for analysis.

In some embodiments, the additional event data comprises machine relationship data indicating trust between machines.

In some embodiments, the processor is configured to process the graph data structures based on a time analysis of security events based on a relation to an attack framework.

In some embodiments, the processor is configured to process the graph data structures based on a density (e.g., volume of anomalies or security events) of the nodes in the graph data structures.

In some embodiments, the processor is configured to process the graph data structures based on graph outliers identified using clustering or neural networks.

In some embodiments, the processor is configured to process the graph data structures by identifying graph outliers using statistical models.

In some embodiments, the processor is configured to process the graph data structures by identifying similar graph data structures to known attacks using neural networks.

In some embodiments, the processor is configured to process the graph data structures by classification of the graph data structures by the number and diversity of their nodes.

In some embodiments, the processor is configured to process the graph data structures using predictions of likely future security events.

In accordance with an aspect, there is provided a computer readable medium comprising machine executable instructions that when executed by a processor: collects data from different data points in a network; processes the collected data using a data model to identify anomalies and generate security events, each event having descriptive data indicating a security threat; correlates and stores the security events in a data store, the data store storing previously generated security events; extracts additional event data not considered to represent security incidents and combining the additional data with the security events; generates graph data structures using the security events and the additional event data, the graph data structures indicating links between nodes, the links being events, the nodes being machines; collects and stores the graph data structures in the data store; processes the graph data structures by combining similar nodes or grouping security events with common features; and generates and transmits security alerts using the processed graph data structures.

In accordance with an aspect, there is provided a cybersecurity process that involves: at a processor, collecting data from different data points in a network; processing the collected data using a data model to identify anomalies and generate security events, each event having descriptive data indicating a security threat; correlating and storing the security events in a data store, the data store storing previously generated security events; extracting additional event data not considered to represent security incidents and combining the additional data with the security events; generating graph data structures using the security events and the additional event data, the graph data structures indicating links between nodes, the links being events, the nodes being machines; collecting and storing the graph data structures in the data store; processing the graph data structures by combining similar nodes or grouping security events with common features; and generating and transmitting security alerts using the processed graph data structures.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DETAILED DESCRIPTION

Embodiments of methods, systems, and apparatus are described through reference to the drawings.

Systems, methods, and computer readable media are described and directed to transforming data representative of abnormal events generated by data analytics by adding data values representative of contextual information to help ensure security mechanisms are focusing on investigating the significant threats.

This platform collects from multiple data sources, e.g. proxy data, firewall data; uses various anomaly detection models to identify and link anomalies to identify and generate security events and intrusions. The platform is configured to generate graph data structures using anomalies identified in the environment and additional event data, the graph data structures indicating links between nodes, the links being events, the nodes being machines and user accounts.

The platform processes the graph data structures by combining similar nodes or grouping security events with common features to behaviour indicative of a single or multiple security events. The graph data structure is generated that can be used to provide a more accurate detection mechanism of an intrusion. Accordingly, more complex "attack chains" can be identified and potentially acted upon (e.g., by providing an output data structure that is used to execute remediation processes or invoke quarantine/risk mitigation functions).

In contrast to approaches that identify individual alerts that require investigation, embodiments described herein are computational mechanisms that attempt to identify chains of related events that when reviewed individually could be false positives or dismissed as normal network traffic through generated graph structures.

Not all embodiments are directed to cybersecurity. For example, in a variant embodiment, graph data structures can be used in relation to physical security, such as tracking the movement of evidence in a police evidence room, where anomalies in evidence description can link occurrences to an individual or a set of individuals.

Figure 1:
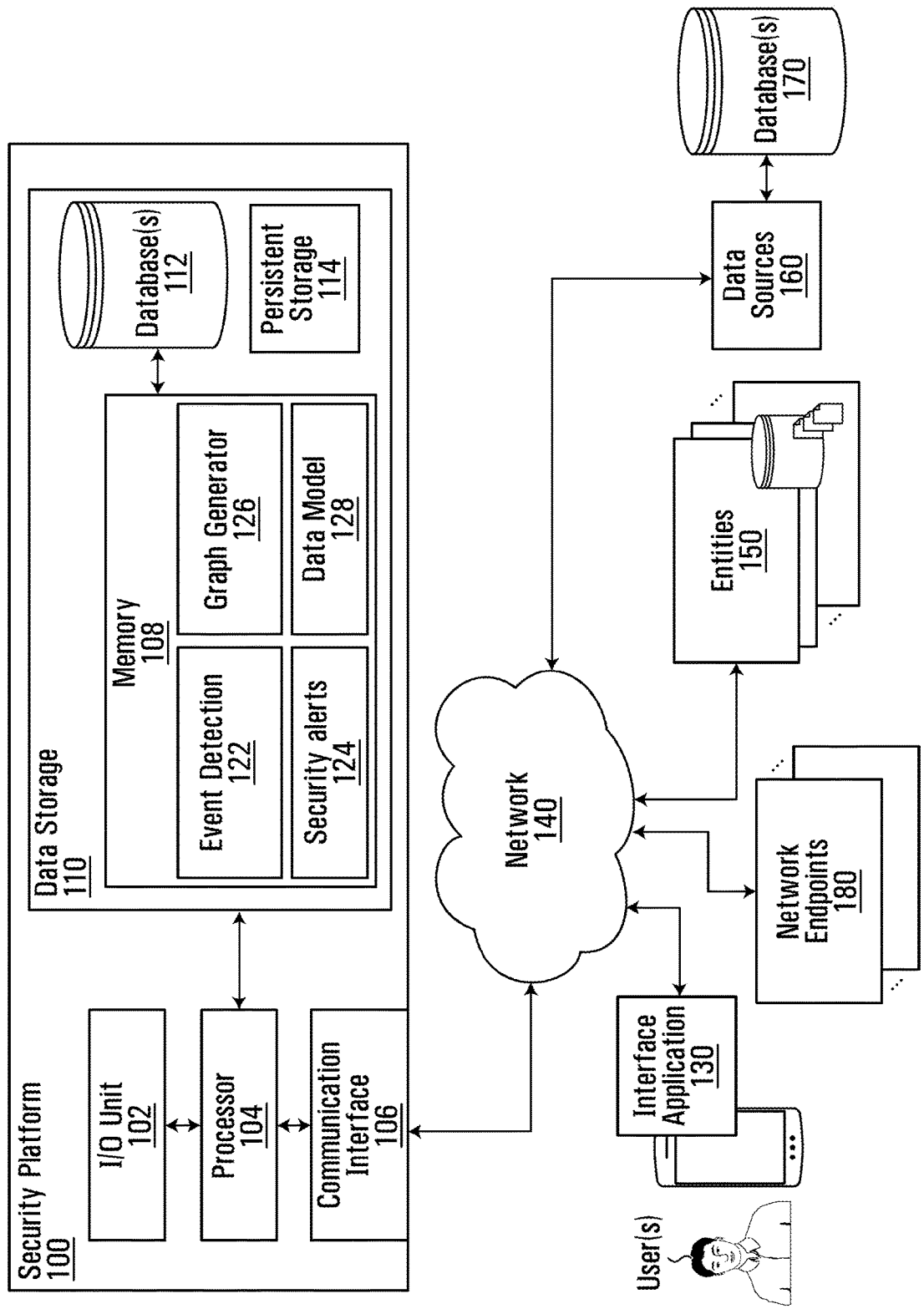
FIG. 1 is a schematic diagram of a security platform, according to some embodiments.

FIG. 1 is a schematic diagram of a security platform 100, according to some embodiments. The platform 100 can implement aspects of the processes described herein. While the platform 100 is described in relation to cybersecurity in embodiments herein, Applicant notes that the platform 100, in variant embodiments, can be used to monitor attack chains for non-cybersecurity related protection of buildings, interactions between individuals, etc.

Security platform 100 connects to interface application 130, network endpoints 170, entities 150, and data sources 160 (with databases 170) using network 140. Entities 150 can interact with the platform 100 to provide input data and receive output data. Network 140 (or multiple networks) is capable of carrying data and can involve wired connections, wireless connections, or a combination thereof. Network 140 may involve different network communication technologies, standards and protocols, for example. The interface application 130 can be installed on user device to display an interface of visual elements that can represent security alerts and chains of events.

The platform 100 can include an I/O Unit 102, a processor 104, communication interface 106, and data storage 110. The processor 104 can execute instructions in memory 108 to implement aspects of processes described herein. The processor 104 can execute instructions in memory 108 to configure event detection 122, security alert unit 124, graph generator 126, data models 128, and other functions described herein.

Security platform 100 can provide cybersecurity measures to identify fraud events, security events, anti-money laundering events, and so on, by using graph representations of chains of events and processing links between the events in the chains. An example event is a simple event of user logging in at New York instead of Montreal, which may be an anomaly based on past usage. Security platform 100 can reduce false positives using rule-based data models 128. Security platform 100 can collect data from different network end point 170 and entities 150. Security platform 100 can reduce false positives to use resources more efficiently to target actual threats and more complex chains of events.

Security platform 100 collects data from various data points in a network 140. Security platform 100 can process the collected data using a data model 128 to identify anomalies and generate security events using event detection 122. Each event can have descriptive data indicating a security threat; correlate and store the security events in a data store, the data store storing previously generated security events.

In some embodiments, each security event indicates potential attack data, identification of users that may be implicated by the event, identification of machines that may be implicated by the event, and time data. In some embodiments, the descriptive data comprises a risk rating, a weighting or probability indicating likelihood that the security event is a false positive, the time the security event occurred, what phase of an attack lifecycle the security event potentially corresponds to, and the frequency of observed occurrences. The descriptive data can indicate the security threat comprising a potential severity of the event, a probability that the event is not security related, and a reference to a stage of an attack that the event can correspond to.

Security platform 100 can implement additional processing of the security events before storing in the data store by leveraging external and internal data sources 160 linked to the events. Security platform 100 extracts additional event data not considered to represent security incidents and combine the additional data with the security events. In some embodiments, the additional event data (e.g. event metadata) indicates machine relationship data indicating trust between machines. This trust data includes relationships between machines, such as data sets indicative of security requirements (e.g., machine A trusts machine B, essentially allowing machine B to perform actions on A with lower security requirements). Other examples of additional event data include network file shares that allow other machines to modify local system files, and machines that do not require passwords for logging in from trusted hosts). Network login information (logins that happen between machines rather than interactively on a workstation), can also be a source of trust relationship information.

Security platform 100 can generate graph data structures using graph generator 126, the security events and the additional event data. The graph data structures can indicate links between nodes, the links being events, the nodes being machines, or interactions being nodes. Security platform 100 labels the graph data structures with the descriptive data. Security platform 100 can collect and store the graph data structures in the database 112. Nodes can be entities, such as machines, individuals, computer accounts, or physical entities, such as buildings. Information that is tracked in the graph data structures can include digital sets of data, but may be representative of physical characteristics, such as broken locks, windows, etc. Other additional information that is used for descriptive data include interaction data, including physical interaction data.

Security platform 100 can process the graph data structures using graph generator 126 by combining similar nodes or grouping security events with common features. Graph data structures are processed based on a time analysis of security events based on a relation to an attack framework.

For example, security platform 100 can process the graph data structures based on a density of the nodes in the graph data structures. Example pseudocode is provided in relation to some embodiments.

Graph outliers are identified using clustering or neural networks, or statistical models. Similar graph data structures to known attacks can be compared using neural networks. Security platform 100 can process the graph data structures by classification of the graph data structures by the number and diversity of their nodes, or using predictions of likely future security events.

Security alerts are generated, encapsulated, or invoked using security alert unit 124 and the processed graph data structures. These security alerts are adapted to reflect generated predictions of attacks that are based on attack chains of events, as opposed to only singular or individual security events. Accordingly, in some embodiments, while the underlying security events of the graph data structure by themselves do not represent an attack, the combined analysis of the graph elements through traversing the graph elements may lead to an estimation of an attack.

Security platform 100 can generate simulations that mimic the actions and techniques of sophisticated hackers. During these assessments, security platform 100 can configure rules linked to issues identified that were not easily detectable using conventional security tools. Security platform 100 can build models that identify security threats (e.g. via event detection 112) by analyzing volumes of network logs, user behaviour, and other relevant information.

Security platform 100 can limit the number of abnormal events that trigger generation of notifications by security alerts 126 to those that are relevant from a security prospective using rules and parameters. Security platform 100 can minimize or avoid over optimizing the model to remove false positives as this can often result in a large number of false positives and potentially removed important alerts for (actual) threats. Security platform 100 can flag events generated by event detection 112 using data analytics processes and append additional context so that security alert unit 126 flags key threats for investigation and alert generation.

Security platform 100 collects data from different data points in the network(s) 140. These could include network endpoints 170 (servers and workstations), network infrastructure, security appliances, entities 150, or other devices that generate data relevant to network security.

Security platform 100 models the data using data model(s) 128 and processes the data using event detection to identify anomalies based on event configurations or rules. Each model/analytic produces an event data structure that includes descriptive data indicating the potential security consequences. The descriptive data could include the potential severity of the event, a probability that the event is not security related (or is likely a false positive), and a reference to which stage of an attack that this event could correspond to. The stages of an attack can leverage frameworks such as Lockheed Martin's Cyber Kill Chain™ and the MITRE ATT&CK Framework™, for example.

In addition to this descriptive data, each event data structure can contain details of the potential attack, including which users are potentially impacted and which machine(s) (externally and locally) are impacted, and the time the event occurred.

Graph generator 126 generates graph data structures that represent chains of events, where events can be connected by links. A chain of events can be an order or sequence of event data structures. Graph generator 126 generates graph data structures by processing events and detecting chains of events or links between events. Graph generator 126 can identify common elements between events and identify attack chains to flag sophisticated hacker threats. Graph generator 126 can generate graph structures that represent chains of events after the attack to recreate what and how the attach happened. Graph generator 126 can generate graph structures that represent chains of events at an earlier stage to prevent or pre-empt an attack.

Graph generator 126 generates graph data structures that represent chains of "chains of events" and can link multiple chains together which help identify new chains of events. Graph generator 126 can implement a triage of attack graphs to know which ones are attacks and which are false positives (e.g. user login at atypical location, requesting an unusual website). Graph generator 126 can process events by generating data elements representing an order or sequence of events, time between events, location of events, and so on using rules-based filtering. Graph generator 126 automatically generates graph data structures using predictive rules that evaluate the events and sequence of events.

Security platform 100 implements additional processing of the events to generate individual alerts using configurations or rules defined by security alerts 124. The security alerts 124 can enhance the validity of the alerts by leveraging external and internal data sources 160. Security platform 100, in some embodiments, is configured not to discard alerts and to avoid over optimize the processing of alerts to remove false positives. Accordingly, individualized anomalies which themselves are not enough to trigger an alert may be captured as they may be part of an attack chain, whereby a number of anomalies in concert do trigger an security alert. Security platform 100 can gather and store the alerts in a central location (e.g. databases 112, storage 114) that can include previously generated alerts.

Security platform 100 can extract additional event data that are not considered security incidents from available data sources 160 and added to the security alerts. This information can center on relationships between machines, such as implicit trusts (e.g. machine A trusts machine B, essentially allowing machine B to perform actions on machine A with lower security requirements). Additional examples include network file shares that allow other machines to modify local system files, machines that do not require passwords for logging in from trusted hosts), and network login information (e.g. logins that happen between machines rather than interactively on a workstation).

Graph generator 126 can combine the security events/alerts and the related event data into multiple graph data structures that shows the links between events. For example, a security event between two machines would have two nodes (each machine), connected by a link that is the event (e.g. a suspicious use login). The security events are labeled with appropriate details describing the events, such as a risk rating, weighting or probability indicating how likely it is to be a false positive, the time it occurred, what phase of an attack lifecycle it potentially corresponds to, and the frequency of observed occurrences.

Security platform 100 can collect the multiple graphs data structures in a central location (e.g. database 112) where an analysis of each graph, and how they compare to each other, can take place by security alerts 124. Potential false positives might have not been filtered out of the events many of the graphs might have few linked nodes as the events might not be part of an ongoing attack. By identifying unique groupings of events in a graph form, the security platform 100 can identify intrusions more complex than a simple malware infection.

Graph generator 126 can use links to create meaningful connections between events and security alert unit 124 can map graph data structures representing chains of events to between the security events. As an example, for network events there might be a source and destination, and a user associated with it. The connections between events can occur when the graph generator 126 detects two (or more) events with something in common. For example, if Event X is between machine A and machine B, and event Y is between machines A and machine C, then graph generator 126 may create a link to indicate that they are related as events X and Y both have machine A in common.

The graph generator 126 can link the connected events together in a graph, and then store them in a graph database (e.g. database 112).

Security platform 100 can collect and store network log data in a database 112 before it is ran through the data models 128 (e.g. Hadoop™ cluster) and event detection 122. The results are then stored either in a file at data storage 110 or in a database 112. The events in this database 112 then go through the additional processing by graph generator 126 where they can be linked together and graphs created.

In some embodiments, the security events can be stored in a list before they are linked together. The graphs and chains that result from linking together the events by graph generator 126 can be stored in a graph database 112.

The security alert unit 124 can implement reduction of security false positive events by using an analysis of source IP randomness, for example. The statistical data models 128 can make an assumption that the IP addresses do not change. However, this assumption might not be correct and biases the results. Accordingly, security alert unit 124 can use or generate additional factors to reduce and identify false positives by giving an indication for how valid that initial assumption is for an IP address.

The security alert unit 124 can reprioritize the alerts (e.g. security events) or rescore them with the additional information. This allows the security platform 100 to ignore some alerts or events while focusing resources on the alerts that are most accurate.

The security platform 100 is able to correlate back to a log despite the massive amounts of data by the use of an underlying assumption that IP addresses related to log events are always related to the same machine. The amount of processing required is much less. Also, the ingestion of log sources might not happen in the same time frame. For example, the data from the source used to generate the statistical data model 128 might be in real time, but the data from the logs needed for mapping IPs to physical machines might be retrieved daily. The approach used by security platform 100 does not have to wait for the additional data source to be retrieved.

The security platform 100 consumes data into the data models 128 (e.g. Hadoop™ environment, statistical models) and then the results are stored in a file or database 112. The data ingestion into the Hadoop™ environment might be different for different log sources and could be in real time (streaming) or as a batch at the end of each day.

The security alert unit 124 can generate a confidence measure and measure of stability before trigger an alert notification. The security alert unit 124 can calculate an average of different machines associated with each IP address for the same timeframe used by the statistical model 128. Alternative approaches would be to include a measure of how long each IP address was associated with each machine as part of the measure. For a comparative approach to determine how more stable one IP is to another the security alert unit 124 can map the averages to a statistical distribution (e.g. Normal or Student-T) to see which are outliers. If an outlier on this is associated with an alert, the platform 100 would be much less confident that the alert from the statistical model is genuine. The security alert unit 124 implements a chain of event link analysis.

The I/O unit 102 can enable the platform 100 to interconnect with one or more input devices, such as a keyboard, mouse, camera, touch screen and a microphone, and/or with one or more output devices such as a display screen and a speaker.

The processor 104 can be, for example, a microprocessor or microcontroller, a digital signal processing (DSP) processor, an integrated circuit, a field programmable gate array (FPGA), a reconfigurable processor, or combinations thereof.

Memory 108 includes a combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Data storage devices 110 can include memory 108, databases 112 (e.g. graph database), and persistent storage 114.

The communication interface 106 can enable the platform 100 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The platform 100 can be operable to register and authenticate users (using a login, unique identifier, and password for example) prior to providing access to applications, a local network, network resources, other networks and network security devices. The platform 100 can connect to different machines or entities 150.

The data storage 110 may be configured to store information associated with or created by the platform 100. Storage 110 and/or persistent storage 114 may be provided using various types of storage technologies, such as solid state drives, hard disk drives, flash memory, and may be stored in various formats, such as relational databases, non-relational databases, flat files, spreadsheets, extended markup files.

The security platform 100 can provide or generate context matters for security events to attempt to avoid analyzing security events in isolation. The security platform 100 can link together security events to identify sophisticated attacks that would otherwise be dismissed as 'noise'.

Figure 2:
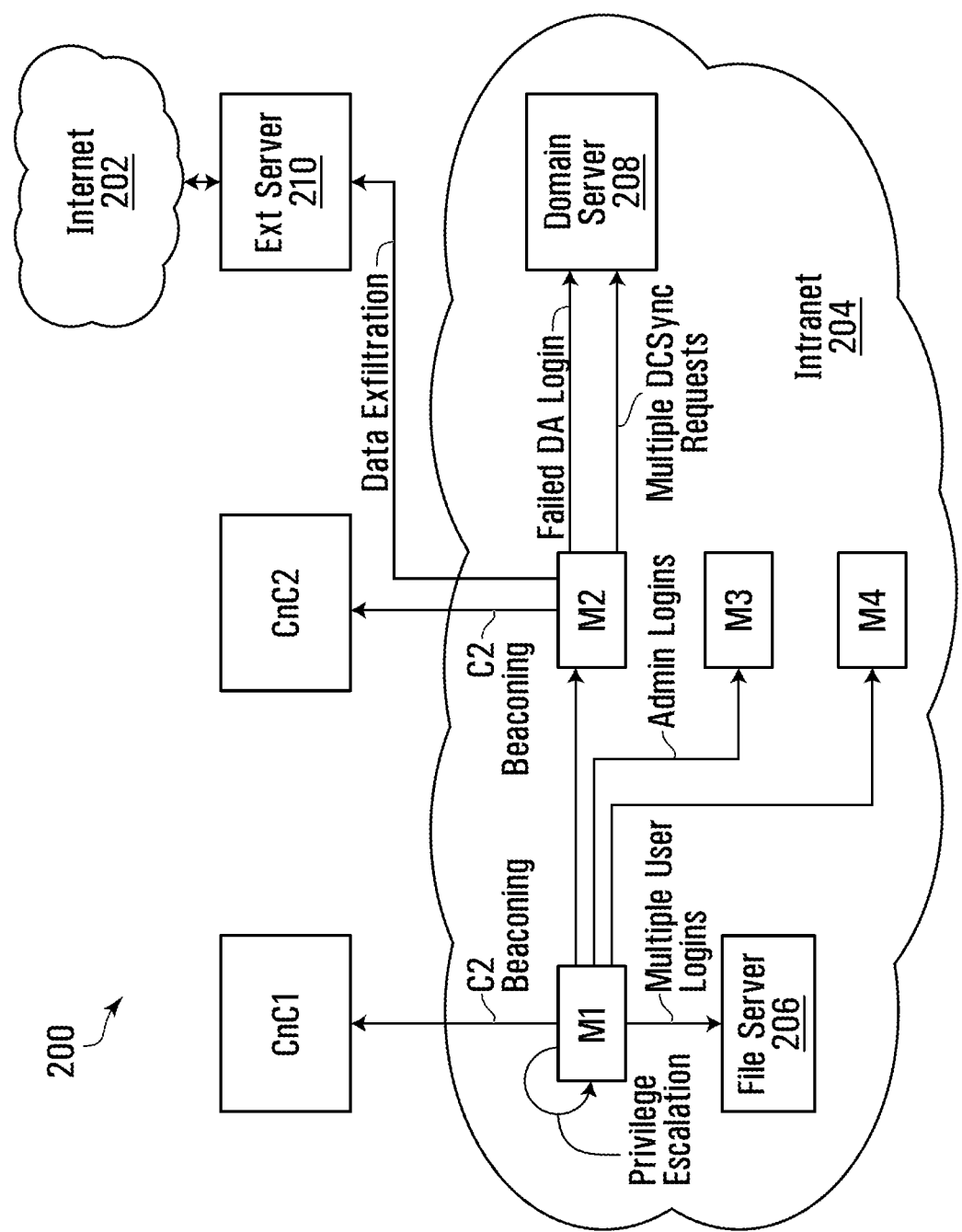
FIG. 2 is a schematic diagram of systems attempting to access computing resources, according to some embodiments.

FIG. 2 is a schematic diagram of system 200 illustrating machines attempting to access computing resources on an intranet 204 and the Internet 202.

The security platform 100 can process linked events (e.g. chains of events) and reduce false positives. The following example events might be prone to false positives and independently might not be indicators of compromise.

An example event can involve potential beaconing from two systems (machine M1 and machine M2) at command and control servers CnC1 and CnC2. Another example event can involve numerous failed password attempts at file server 206 for different users originating from M1. A further example event can involve multiple local administrative logins at machine M3 from machine M1 on the intranet 204. Another example event can involve domain controller sync requests from M2 to domain server 208. A further example event can involve failed login for an active directory account at domain server 208 from M2. Another example event can involve potential data exfiltration at external server 210 from M2. Another example event can involve an unknown program ran in a system context on M1.

Individually these alerts can be overlooked by a security operations centre (SOC). Using link analysis, the security platform 100 can identify that the events are likely all related and part of an attack.

Figure 3:
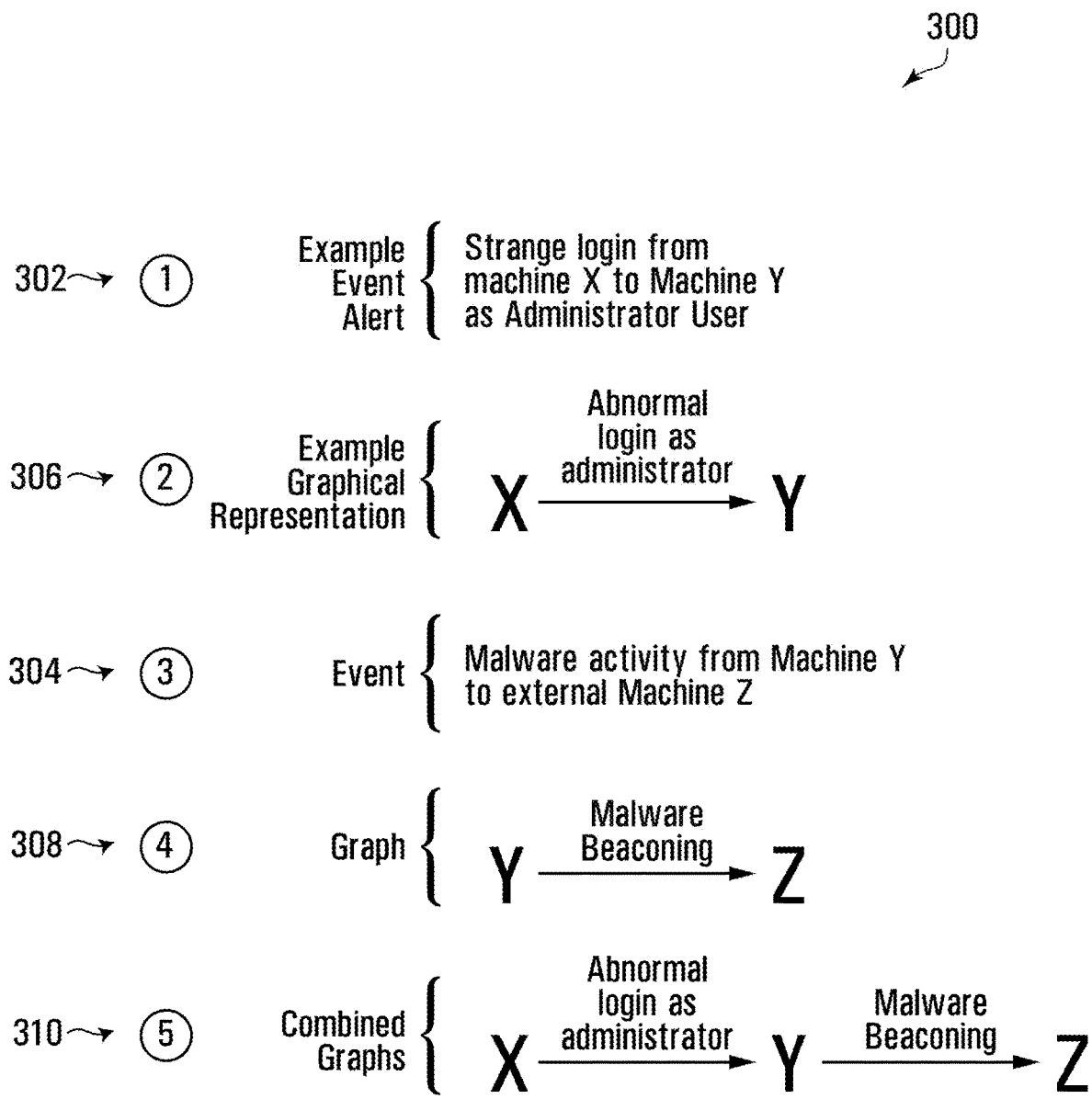
FIG. 3 is a diagram of two example events, according to some embodiments.

FIG. 3 is a graph diagram representation 300 of two example events 302, 304. An example event 302 can involve a strange login machine X to machine Y as an administrative user. Another example event can involve machine activity from machine Y to external machine Z.

Each event 302, 304 can have a 2 node graph 306, 308 combined and linked into a single 3 node graph 310. For example, a 2 node graph 306 links machine X (node 1) and machine Y (node 2) by the event 302. Another 2 node graph 308 links machine Y (node 1) and machine Z (node 2) by event 304. A combined 3 node graph 310 links machine x (node 1) with machine Y (node 2) by event 304 and links machine Y (node 2) to machine Z (node 3) by event 304 to form a chain of events. Graph generator 126 is configured to generate the graphs 306, 308, 310.

Figure 4:
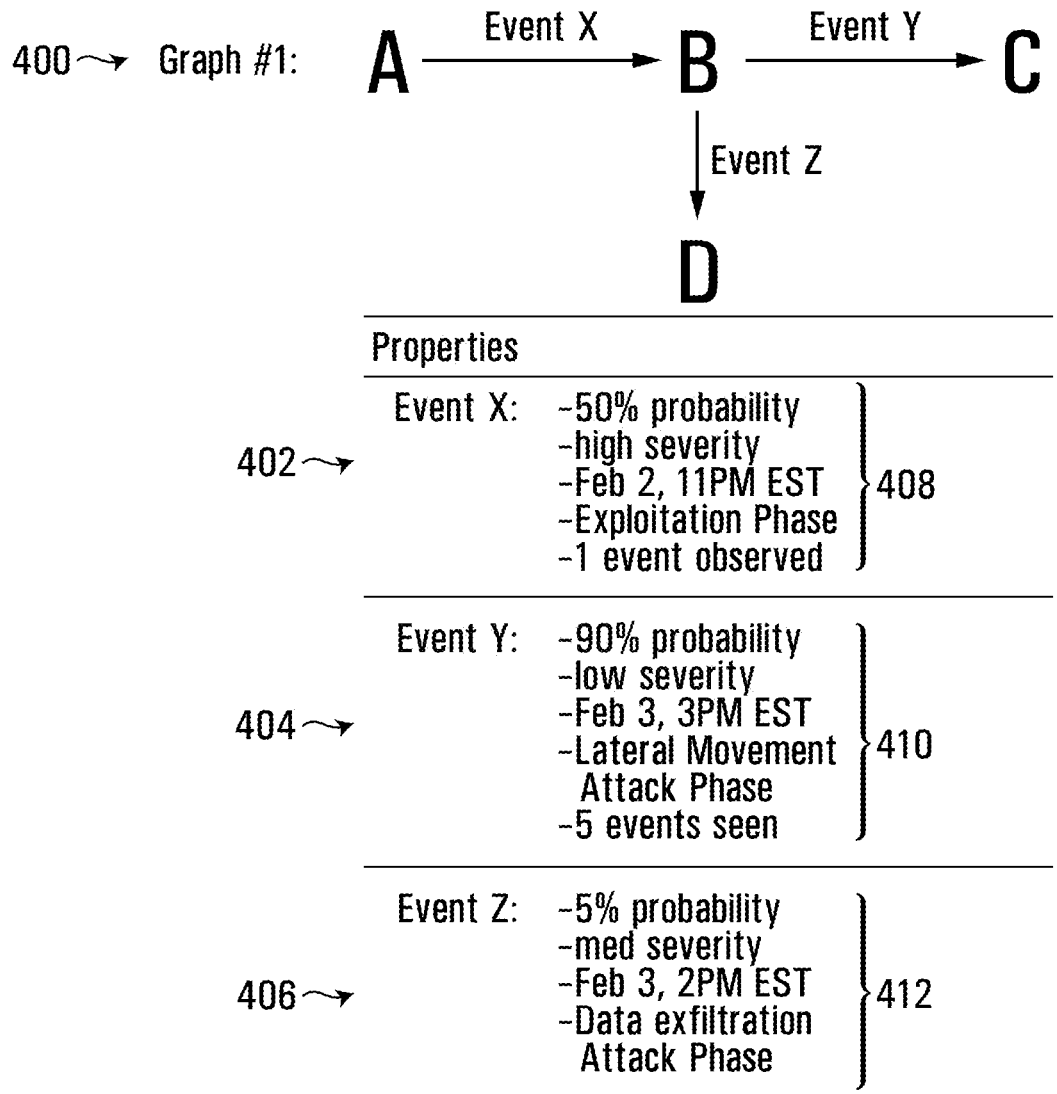
FIG. 4 is a diagram of a graph representation of a network attack chain of events, according to some embodiments.

FIG. 4 is a diagram of example graph 400 of events 402, 404, 406. The example graph 400 represents a network attack chain of nodes, constructed from 3 events (e.g., event x, event y, event z). Each event is listed with various related properties 408, 410, 412 such as a probability or confidence score, severity level, time, data, type, number of observed events, and so on.

Figure 5:
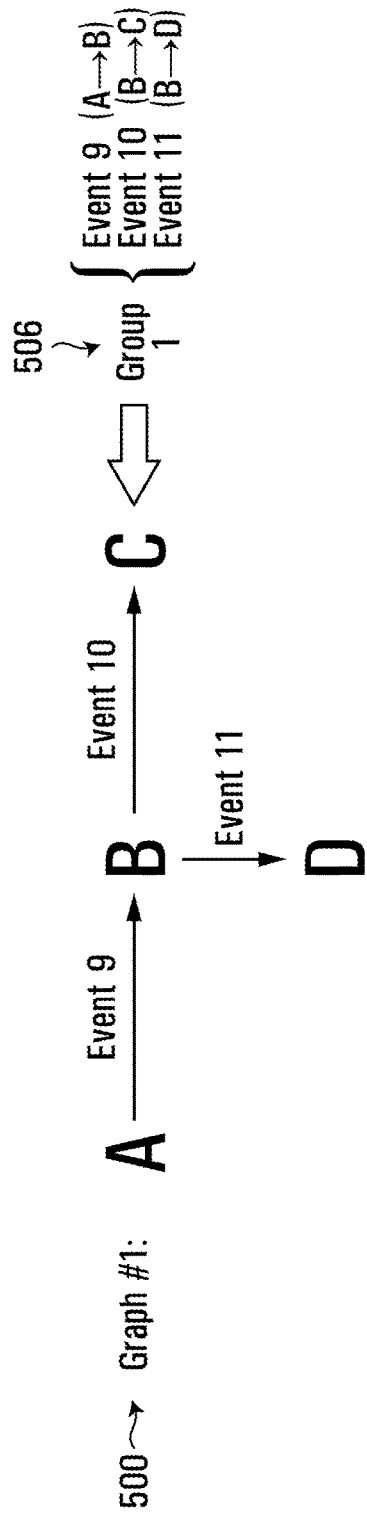
FIG. 5 is a diagram of example graph representations of events, according to some embodiments.
Figure 5:
Figure 5:
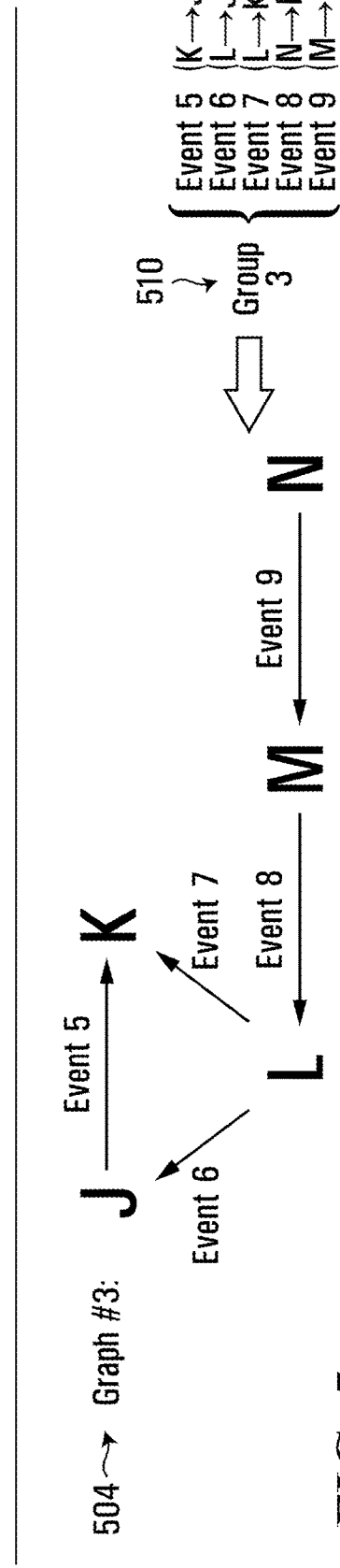

FIG. 5 is a diagram of example graphs 500, 502, 504 of events. Events are grouped together into different groups 506, 508, 510 based upon common elements. A collection of these graphs 500, 502, 504 and groups 506, 508, 510 is created and placed in a centralized location, such as graph database 112.

Figure 6:
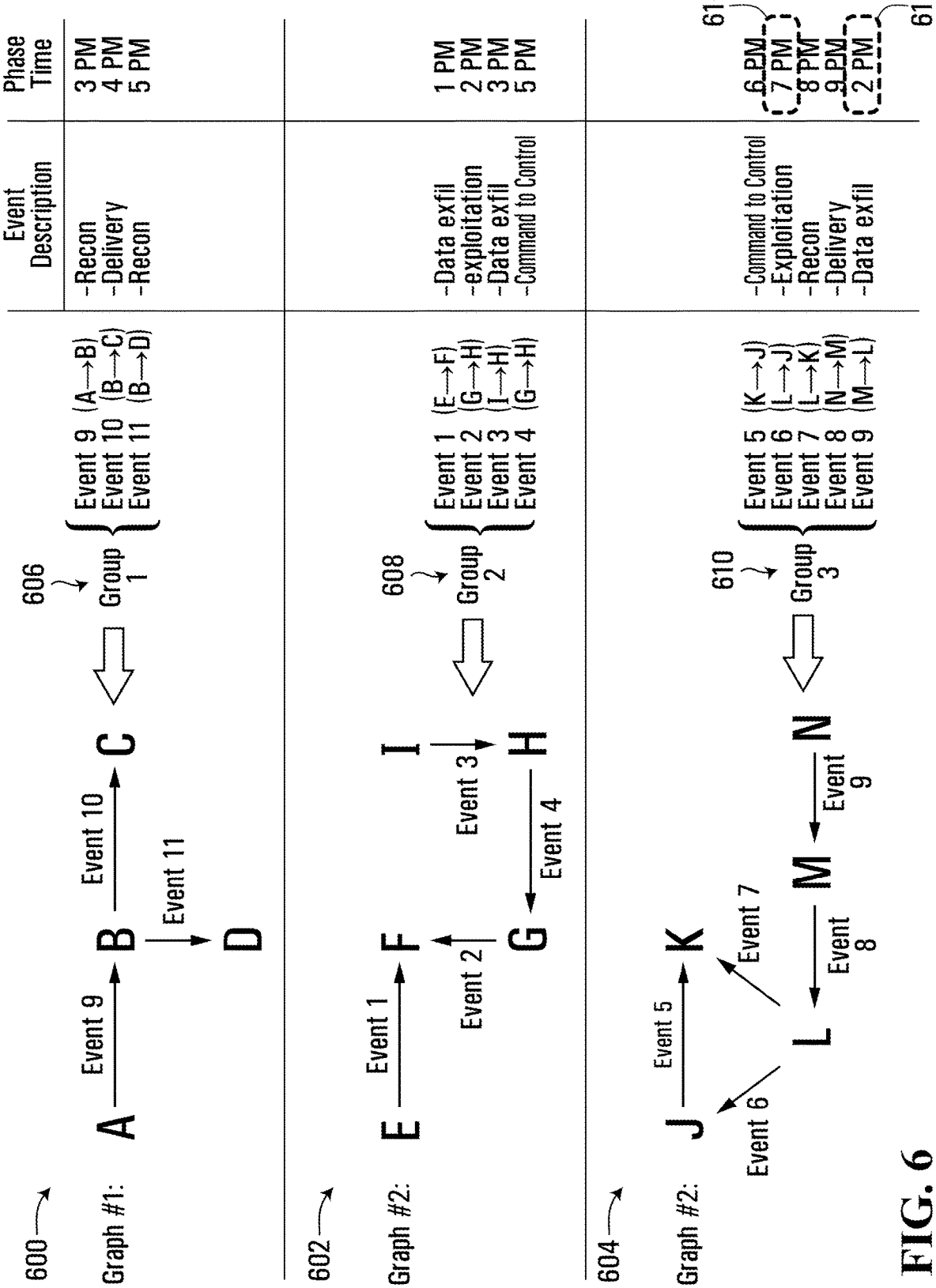
FIG. 6 is a diagram of example graph representations of events with time data, according to some embodiments.

FIG. 6 is a diagram of example graphs 600, 602, 604 of events with time data 612. Events are grouped together into different groups 606, 608, 610 based upon common elements. Each group 606, 608, 610 has associated time data. The security platform 100 can process the time data 612 and, in particular, the times associated with the attack framework phase to identify shows two anomalies 614, 616. The data exfiltration event (e.g., event 9) occurred before the earliest event linked to the exploitation phase (e.g., event 6). Normally, exploitation takes place before exfiltration of data (which may be codified as a rule) and flagged by security platform 100 as anomalies 614, 616.

There are several different techniques that security platform 100 can use to process potential attack chains. The analysis of the attack chains is used by security platform 100 to determine which map to an active attack is in progress and which are the result of random events or false positives. This kind of analysis changes the approach defenders use for classifying threats. The security platform 100 can weigh potential incidents (defined as groups of events) rather than individual events.

The following are example techniques that can be implemented by security platform 100 for processing graph chains.

In some embodiments, the security platform 100 is configured to extract metadata to enhance the security event data. Metadata can be extracted from timestamps, device permissions, active/inactive accounts, file permissions, share permissions, group policies, etc. In some embodiments, as described herein or otherwise, the security platform 100 determines relationships and/or permission data relating to machines and/or accounts associated with one or more of the events. Events can include, for example, events that are associated with suspicious behavior, such as data extraction/exfiltration, signals transmitted that appear to be bound for an external command/control interface, recon data (e.g., port scanning/whitelist or blacklist probing), data payload delivery, among others. The security platform 100 can, in some embodiments, store the metadata in a data structure associated with a security event or can be linked or otherwise associated with the security event data. This data structure can store data elements and may be representative, for example, of event descriptors, the extracted metadata, the involved devices, among others.

In some embodiments, as illustrated, for example in FIG. 6, the security platform 100 is configured to generate a graph data structure encapsulating the event data and the relationships between them based in some scenarios on the event metadata. The graph data structures can include links, pointers, identifiers, and/or the like or can otherwise indicate links between nodes (e.g. machines). In some embodiments, the links represent an event involving a relationship between nodes. The links may be embedded or otherwise associated with the extracted metadata obtained from the data structure.

The graph data structure may be traversed through the links as between the nodes of the graph data structure as shown in the example embodiments of FIG. 6. The traversal may be tracked to determine an overall security incident score associated with a group of events, which may be modified, for example, during traversal through the tracked metadata associated with each of the events. The overall security incident score may be used, for example, to determine that a security incident has occurred across the aggregate of the events (e.g., representing an "attack chain", even if the individual events themselves do not lead to a finding of a security incident). In some embodiments, the security incident score is a pre-defined threshold.

The security platform 100 can implement a time analysis of alerts based upon their relation to an attack frame work. For example, given a graph linking numerous security events, the security platform 100 enhances the validity of an attack graph by first linking the time each event in the chain fired with the categorization of the event. An event can be categorized based using the Lockheed Martin Cyber Kill Chain™ or MITRE attack Framework™, for example. Sequence of events that fit into a frameworks attack progression can then be prioritized by security platform 100 through a scoring/ranking system. For example, attackers might compromise a machine before they exfiltrate data from a network. If the data exfiltration alerts are all observed prior to the compromise alert, this attack chain is less likely to match an active attacker's actions than events with the reverse order.

The security platform 100 can implement graph processing using the density of nodes in a chain. Each attack graph can be derived from numerous events with characteristics in common (e.g. a common machine or user) being grouped together. Each event can be assigned a score or ranking by security platform 100 indicating how severe the threat is. Events may also have a weighting or probability assigned to them indicating how likely the event is not a false positive.

The security platform 100 can determine a combined score of an attack chain based upon the likelihood of the event being a false positive and the severity of the event. If the probability/weighting of the events are not known, then they can be ignored by security platform 100. This score can be formed by a summation of all of the event scores, each adjusted by the possible weighting or probability of being a true positive. The value assigned to the attack chain can then be used to prioritize a review relative to other chains.

The security platform 100 can implement graph processing using graph outliers identified using clustering or neural networks. Once a set of attack graphs has been generated, features of each graph (e.g. number of events, score of each event, length of events, linkages to an attack model, such as for example, MITRE ATT&CK™ or Lockheed Martin's Killchain™, time differences between occurrences of each event, and so on) can be used by the security platform 100 to determine a score allowing them to be represented as plots in a graph (e.g., by graph generator 126). A neural network is an example method used to create these representations of each graph a specific feature set (a feature is what the security platform 100 can tell the neural network to take into consideration). The clustering of each attack group can be used to render or generate an interface with interactive visual elements or controls which an analyst to visually identify graphs that are notably different than others. If a large number of graphs are generated that primarily consist of false positives, then security platform 100 can cluster these events close to each other (e.g., visually proximate to one another).

The graph approach can be used filter out these events allowing the security platform 100 to concentrate on more unique or interesting chains and generate security alerts for these more unique or interesting chains (via security alert unit 124).

The security platform 100 can implement graph processing by identifying graph outliers determined using statistical analysis. The security platform 100 can assign a score to attack chain using a different approach (e.g. the foregoing scoring technique). The security platform 100 maps each of the values on to a probability distribution (e.g. the normal distribution). Attack graphs with scores that are statistically distant (e.g., measured by one, two, three standard deviations) from the mean/median/mode can be prioritized by the security platform 100 for review and can trigger security alert generation (via security alert unit 124).

The security platform 100 can implement graph processing by identifying graphs that are similar to known attacks using a neural network. As in the foregoing technique, attack graphs can be fed by the security platform 100 into a neural network that trains itself on different features. One or more known attack chains can also be introduced into the neural network and is labeled as such. The neural network can then distribute the attack chains into clusters based upon their similarity to the known attacks. This can enable alert generation for identified attacks that have similar characteristics to attacks that the security platform 100 knows are possible or has already seen and identified before.

The security platform 100 can implement graph processing by classification of graphs by the number and diversity of their nodes. Each attack chain can have a variable length with events that can be classified in multiple ways. A score can be calculated to represent the diversity (quantity of unique node attributes) of each graph. Graphs can then be prioritized for review based upon their diversity rating.

The security platform 100 can implement graph processing based on prediction of likely future events. The security platform 100 can use a Bayesian belief network, for example, and can propagate beliefs of what an attack chain should look on the graph using weighted probabilities. When a new event occurs that was predicted, then the security platform 100 can indicate that the event is less likely to be a false positive.

Link analysis is used by security platform 100 to show the relationships between systems and users connected to a security incident and to trigger alert generation. The interface application 130 can display an interface with visual elements corresponding to security incidents and the security platform 100 can generate the interface with visual elements. The interface can be updated as new data is collected by the security platform 100. The graph based approach allows security platform 100 to generate improved alerts which can enable analysts to save time investigating events as they can link systems and events together.

The security platform 100 uses graphs as a more accurate detection mechanism of an intrusion. The security platform 100 attempts to identify chains of related events that when reviewed individually could be false positives or dismissed as normal network traffic. The security platform 100 attempts to identify intrusions by constructing potential attack chains and then applies rules to determine the likelihood/severity of the incident.

The foregoing discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

Example Pseudocode

The followings are examples of anomalies that are usually harmless, but could indicate a security event as part of an attack chain:

Repetitive connections made from an internal machine to an external one that could indicate malware beaconing Numerous password failed attempts for different users originating from the same machine Abnormal logins to a server Domain controller sync requests originating from an atypical host on the network Failed logins for privileged system accounts Abnormal volumes of data exiting the network from a single host Unknown programs running in a privileged context.

There are various techniques that can be used to detect anomaly and an approach can select among them based on the type of the problem, and below are provided some example of methods that are used for anomaly detection:

1) Classification based detection
2) Clustering base detection, e.g. using nearest neighbour technique
3) Statistical analysis: parametric and non-parametric
4) Using information theory approach; in information theory surprise is considered as anomaly, higher the entropy of the event means the higher chance of anomaly Pseudocode is provided below in respect of embodiments of a graph data structure based approach to attack chain detection.

```
Function CollectAndJoinData (path to data set1, ..., path to dataset N){
        Data1 <-- read data from data set 1;
        DataN <-- read data from set N;
        JoinedData <-- join Data1, Data2, ... , DataN on time, IP, account name or any other common
        identifiers
        Return joinedData
    end
}
Function Anomaly_detection_X (JoinedData, windows time, number of connection in past windows, initiated
server, destination server, computer name){
        using one or more of the aforementioned techniques to find entities such as computers, servers, IPs,
        accounts that are out side the normal clustering.
        databaseAnomalyResult <-- list of time windows and reason of anomaly for entities that show
        anomalous behaviour in a database
        save databaseAnomalyResult
        return path of the database
    end
}
Function enrichment_of_anomaly_results(databaseAnomalyResult, enrichment data sets1, ... enrichment
data setsN){
        databaseEnrichedAnomalyResult0 <-- enrich results in databaseAnomalyResult by adding internal
        information regarding work station, job title, work group, location, etc. from enrichment datasets
        databaseEnrichedAnomalyResult <-- enrich results in databaseEnrichedAnomalyResult0 by adding
        external information regarding destination IPs reputation, score, etc.
        save databaseEnrichedAnomalyResult
        return path of the enriched database
    end
}
Function graph_construction(joinedData, databaseEnrichedAnomalyResult){
        GraphSecurityEvents <- graph (nodes, edges)
        graph nodes <-- entities such as machine, individuals, computer account, any other unique identifier
        of entities from joinedData
        graph edges <-- number of connections, information from databaseEnrichedAnomalyResult, time of
        connections, [if known] malicious connection or not from joinedData and
        databaseEnrichedAnomalyResult
        save GraphSecurityEvents in a graph database format
        return path of GraphSecurityEvents
    end
}
```

```
Function FeatureSelectionFromGraph(GraphSecurityEvents){
    Select following features form GraphSecurityEvents:
        LABEL_concat: concatenation of Labels assigned to previous connections from Source to
        Destination. Labels could be among: Regular (REG), True Positive, True Negative, False
        Positive, False Negative
        count: the count of historical connections from source to destination
        maxTDiff: the maximum of time interval (in seconds) between consecutive historical
        connections from source to destination
        minTDiff: the minimum of time interval (in seconds) between consecutive historical
        connections from source to destination
        avgTDiff: the average of time interval (in seconds) between historical connections from
        source to destination
        src_outDegree: out degree of source in historical graph
        src_total_cnt_send: total count of historical connections sent by source
        src_outgoing_mali_cnt: the count of malicious historical connections initiated from source
        src_inDegree: in degree of source in historical graph
        src_total_cnt_rec: total count of historical connections received by source
        src_degree: degree of source in historical graph
        dst_outDegree: out degree of destination in historical graph
        dst_total_cnt_send: total count of historical connections sent by destination
        dst_outgoing_mali_cnt: the count of malicious historical connections initiated from
    destination
        dst_inDegree: in degree of destination in historical graph
        dst_total_cnt_rec: total count of historical connections received by destination
        dst_incoming_mali_cnt: the count of malicious historical connections targeted destination
        dst_degree: degree of destination in historical graph
        k_core: degeneracy of graph from graph theory
        shortest_path: shortest path between two nodes from graph theory
        connected_components: a subgraph in which any two vertices are connected to each other
        by paths from graph theory
        page_rank: a way to measure importance of the connection from graph theory
    Return list of features
end
Function FindMaliciousconnectrion(list of features, joinedData):{
    run a supervised neural network model to detect malicious/suspicious connections
    return list of the malicious/suspicious connections
end
}
Function TrustedConnections(list of features, joinedData):{
    return list of connections with the highest page_rank feature as a list of trusted connections
end
}
```

What is claimed is:

1. A cybersecurity computing system comprising a processor and a memory storing machine executable instructions to configure the processor to:
  collect data from different data points in a network;
  process the collected data using a data model to identify anomalies and generate security events, each event having descriptive data indicating a security threat;
  correlate and store data elements representing the security events and the anomalies in a data store;
  extract event metadata not considered to represent security incidents and combine the metadata with the security events;
  generate graph data structures using the security events and the event metadata, the graph data structures indicating links between nodes, the links being events, the nodes being machines;
  collect and store the graph data structures in the data store;
  process the graph data structures by combining nodes or grouping security events with common features;
  determine that a processed graph data structure represents an earlier stage of a stored graph data structure that represents an attack;
  generate a confidence measure and a measure of stability of an internet protocol (IP) address associated with each event; and
  generate and transmit security alerts using the processed graph data structures, based on the confidence measure and the measure of stability.

2. The cybersecurity computing system of claim 1, wherein the descriptive data indicates the security threat comprising a potential severity of the event, a probability that the event is not security related, and a reference to a stage of an attack that the event can correspond to.

3. The cybersecurity computing system of claim 1, wherein each security event indicating potential attack data, identification of users that may be implicated by the event, identification of machines that may be implicated by the event, and time data.

4. The cybersecurity computing system of claim 1, wherein the processor is configured to label the graph data structures with the descriptive data.

5. The cybersecurity computing system of claim 4, wherein the descriptive data comprises a risk rating, a weighting or probability indicating likelihood that the security event is a false positive, the time the security event occurred, what phase of an attack lifecycle the security event potentially corresponds to, and the frequency of observed occurrences.

6. The cybersecurity computing system of claim 1, wherein the processor is configured to implement additional processing of the security events before storing in the data store by leveraging external and internal data linked to the events.

7. The cybersecurity computing system of claim 1, wherein the collected data comprises machine relationship data indicating trust relationships between machines.

8. The cybersecurity computing system of claim 1, wherein the processor is configured to process the graph data structures based on a time analysis of security events based on a relation to an attack framework.

9. The cybersecurity computing system of claim 1, wherein the processor is configured to process the graph data structures based on a density of the nodes in the graph data structures.

10. The cybersecurity computing system of claim 1, wherein the processor is configured to process the graph data structures based on graph outliers identified using clustering or neural networks.

11. The cybersecurity computing system of claim 1, wherein the processor is configured to process the graph data structures by identifying graph outliers using statistical models.

12. The cybersecurity computing system of claim 1, wherein the processor is configured to process the graph data structures by identifying graph data structures to known attacks using neural networks.

13. The cybersecurity computing system of claim 1, wherein the processor is configured to process the graph data structures by classification of the graph data structures by the number and diversity of their nodes.

14. The cybersecurity computing system of claim 1, wherein the processor is configured to process the graph data structures using predictions of likely future security events.

15. A method for monitoring cybersecurity attack chains, the method comprising:
at a processor,
collecting data from different data points in a network;
processing the collected data using a data model to identify anomalies and generate generating security events, each event having descriptive data indicating a security threat;
correlating and storing the data elements representing the security events and the anomalies in a data store, the data store storing previously generated security events;
extracting event metadata not considered to represent security incidents and combining the event metadata with the security events;
generating graph data structures using the security events and the event metadata, the graph data structures indicating links between nodes, the links being events, the nodes being machines;
collecting and storing the graph data structures in the data store;
processing the graph data structures by combining nodes or grouping security events with common features;
determining that a processed graph data structure represents an earlier stage of a stored graph data structure that represents an attack;
generating a confidence measure and a measure of stability of an internet protocol (IP) address associated with each event; and
generating and transmitting security alerts using the processed graph data structures, based on the confidence measure and the measure of stability.

16. The method of claim 15, wherein the descriptive data indicates the security threat comprising a potential severity of the event, a probability that the event is not security related, and a reference to a stage of an attack that the event can correspond to.

17. The method of claim 15, wherein each security event indicating potential attack data, identification of users that may be implicated by the event, identification of machines that may be implicated by the event, and time data.

18. The method of claim 15, wherein the processor is configured to label the graph data structures with the descriptive data.

19. The method of claim 15, wherein the descriptive data comprises a risk rating, a weighting or probability indicating likelihood that the security event is a false positive, the time the security event occurred, what phase of an attack lifecycle the security event potentially corresponds to, and the frequency of observed occurrences.

20. A non-transitory computer-readable medium storing machine executable instructions, which when executed on a processor, cause the processor to perform a method for monitoring cybersecurity attack chains, the method comprising:
collecting data from different data points in a network;
processing the collected data using a data model to identify anomalies and generating security events, each event having descriptive data indicating a security threat;
correlating and storing the data elements representing the security events and the anomalies in a data store, the data store storing previously generated security events;
extracting event metadata not considered to represent security incidents and combining the metadata with the security events;
generating graph data structures using the security events and the event metadata, the graph data structures indicating links between nodes, the links being events, the nodes being machines;
determining that a processed graph data structure represents an earlier stage of a stored graph data structure that represents an attack;
collecting and storing the graph data structures in the data store;
processing the graph data structures by combining nodes or grouping security events with common features;
generating a confidence measure and a measure of stability of an internet protocol (IP) address associated with each event; and
generating and transmitting security alerts using the processed graph data structures, based on the confidence measure and the measure of stability.

* * * * *